United States Patent [19]
Vook et al.

[11] Patent Number: 5,636,220
[45] Date of Patent: Jun. 3, 1997

[54] PACKET DELIVERY METHOD FOR USE IN A WIRELESS LOCAL AREA NETWORK (LAN)

[75] Inventors: Frederick W. Vook; Mark Demange, both of Schaumburg; William K. Doss, Lake In The Hills, all of Ill.

[73] Assignee: Motorola, Inc., Schaumburg, Ill.

[21] Appl. No.: 204,040

[22] Filed: Mar. 1, 1994

[51] Int. Cl.$^6$ ..................................... H04Q 7/20
[52] U.S. Cl. .................. 370/338; 370/913; 455/54.2
[58] Field of Search ............. 370/13, 94.3, 95.1, 370/85.2, 17, 85.3, 94.1; 371/33, 34, 67.1, 68.1, 68.2; 455/63, 67.3, 67.4, 67.5, 69, 54.2

[56] References Cited

U.S. PATENT DOCUMENTS

| | | | |
|---|---|---|---|
| 4,352,183 | 9/1982 | Davis et al. | 370/85.2 |
| 4,584,684 | 4/1986 | Nagasawa et al. | 371/33 |
| 4,862,461 | 8/1989 | Blaner | 371/33 |
| 5,210,753 | 5/1993 | Natarajan | 370/95.1 |
| 5,220,564 | 6/1993 | Tuch et al. | 370/94.1 |
| 5,224,105 | 6/1993 | Higley | 371/33 |
| 5,329,531 | 7/1994 | Diepstraten et al. | 370/85.3 |
| 5,339,316 | 8/1994 | Diepstraten | 370/85.13 |

OTHER PUBLICATIONS

IEEE 802.11 Wireless Access Method and Physical Specification, Nov. 1993, Distributed Foundation Wireless MAC, Belanger, Ennis and Diepstraten, pp. 1–72.

*Primary Examiner*—Douglas W. Olms
*Assistant Examiner*—Min Jung
*Attorney, Agent, or Firm*—Val Jean Hillman; Kevin A. Buford

[57] ABSTRACT

A packet delivery method for assuring the delivery of packets in an wireless local area network (LAN) having a service access point (AP) and a plurality mobile user devices, said user devices in communication with each other and with the access point. The access point determines when a destination device is in the sleep mode of operation and stores data packets intended for that device in memory. Thereafter the access point determines when the destination device enters the active mode of operation, delivers the data packets to the destination device and informs the source device of delivery of the data packets to the destination device.

9 Claims, 4 Drawing Sheets

PACKET DELIVERY METHOD FOR USE IN A WIRELESS LOCAL AREA NETWORK (LAN)

FIELD OF THE INVENTION

This invention is directed to a data communications system and in particular to a method for assuring the delivery of packets in a wireless local area network (LAN).

BACKGROUND OF THE INVENTION

Businesses which have adopted wireless LANs transmit data using wireless technologies such as, but not limited to radio frequency (RF) and/or infrared (IR) transmissions. FIG. 1 illustrates a typical packet transmission system comprising a wireless LAN 100. For the purpose of this discussion, wireless LAN 100 includes a system access point (AP) 120 which utilizes RF communications to communicate with a plurality of user devices (UDs) 110 such as portable computers, lap-top computers, personal digital assistants (PDAs) and the like. AP 120 is connected to data network 130 by channel 132 which may include, but is not limited to wires or optical links.

AP 120 controls communication within the illustrated network by passing information to and from data network 130 and the plurality of devices 110. Individual devices 110 are capable of direct communications without assistance by AP 120. Data network 130 may consist of an Ethernet network, a Token Ring network or any other of the well known data networks.

In the system of FIG. 1, problems with data delivery begin to surface as the distance between communicating devices increases. Because devices 110 are capable of independent communications, two such devices may lose communications if they venture outside of their respective ranges of radio coverage. A similar situation arises when devices 110 employ power management schemes which permit the devices to operate in either an active or a sleep mode of operation. As will be appreciated, when a device 110 enters the sleep mode of operation, only the basic device functions such as system clock, timers, interrupts, etc. are operational. During the sleep mode, power to the rest of the device hardware is turned off. In particular, the wireless transceiver portion of an asleep device 110 receives no power, thus, the device can neither transmit or receive information, and therefore cannot perform any communications activities.

Under the above scenarios, the channel access performance of an asleep device or between two devices that are out of range of each other is severely impaired due to their inability to communicate. It would be extremely advantageous therefore to provide a method for assuring packet delivery in a wireless LAN that improves the channel access performance of asleep and/or out-of-range devices.

SUMMARY OF THE INVENTION

Briefly described, the present invention is a packet delivery method for assuring the delivery of packets in a wireless local area network (LAN). The method employs processing steps including, but not limited to receiving from a source device, a transmission comprising data packets destined for a destination device and determining whether the destination device is in a sleep mode of operation. If so, then the data packets are stored in memory. Next, the AP waits a period of time until the destination device enters the active mode of operation, delivers the data packets to the destination device and then informs the source device of delivery of the data packets to the destination device.

In accordance with yet another aspect of the present invention, the source device identifies an out-of-range condition to the AP by placing in a source transmission a request to the AP to deliver data to the destination device.

DETAILED DESCRIPTION OF A PREFERRED EMBODIMENT

Figure 1:
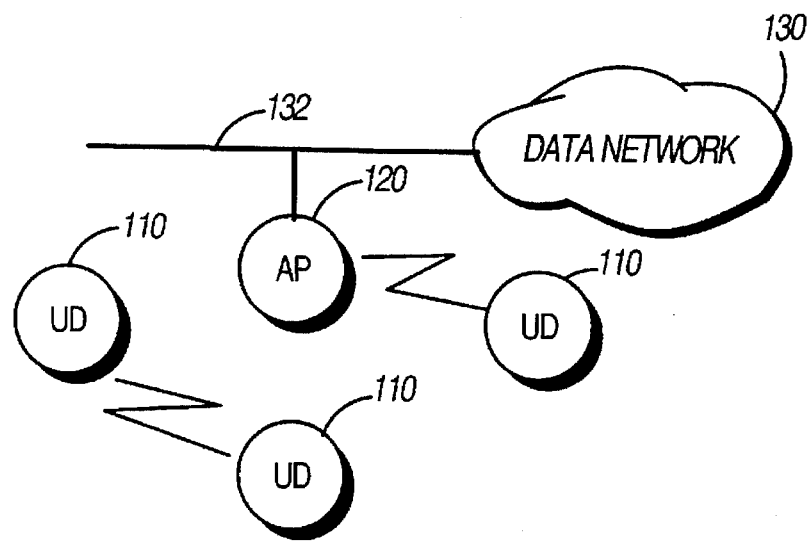
FIG. 1 illustrates in block diagram form a wireless Local Area Network (LAN)
Figure 2:
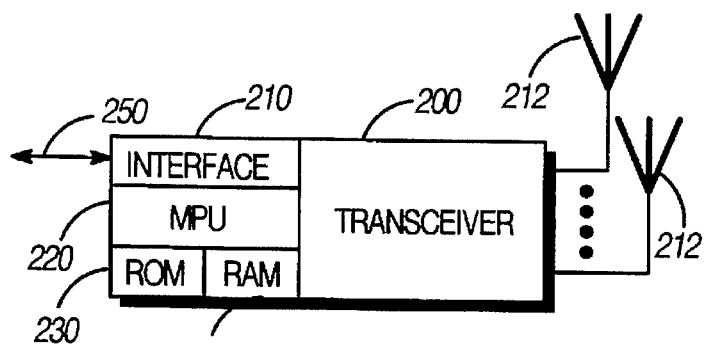
FIG. 2 illustrates a block diagram of a structure common to both the access point and a user device of FIG. 1.

FIG. 2 illustrates a block diagram of a structure common to both access point 120 and user devices 110 of FIG. 1. A wireless transceiver 200 utilizes digital data to modulate a carrier signal to transmit the desired data and its receiver converts received RF signals into corresponding digital data. In accordance with the present invention, transceiver 200 is an RF transceiver. Notwithstanding, it may comprise any other well known wireless communication technology such as, but not limited to infrared (IR) technologies.

Transceiver 200 employs one or more antennas designated 212 for communicating with another device 110 or AP 120 as shown in FIG. 1. A microprocessor 220 operates under the control of an operating system contained in read only memory 230 and utilizes random access memory 240 to control inbound and outbound data traffic carried by path 250 and transceiver 200. An interface 210 may consist of line drivers and input/output buffers and registers as is conventional in microprocessor systems. The path 250 corresponds to communication channel 132 of FIG. 1 where the embodiment is utilized as AP 120 and corresponds to the connection to a terminal device where the embodiment is utilized as a device 110. The microprocessor operation relating to packet delivery is explained in more detail below.

Figure 3:
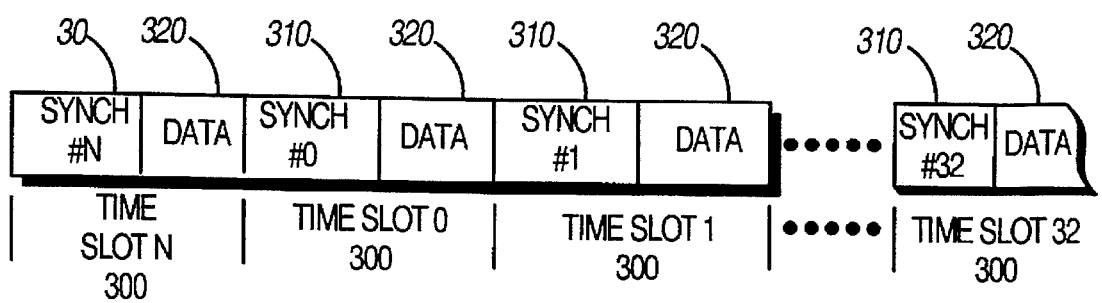
FIG. 3 depicts the structure of a transmission channel for use within the LAN of FIG. 1.

FIG. 3 depicts the structure of a transmission channel for use within the communication system of FIG. 1. In the system of FIG. 1, the information passed between devices 110 and AP 120, is communicated during time slots 300. Each time slot 300 typically contains a Synch interval 310 and a data interval 320. The Synch interval 310 contains a Synch Signal generated by AP 120, and destined for all devices 110 in the AP's zone of RF coverage. In accordance with the preferred embodiment each Synch Signal may comprise synchronization information, control data, and an indication to a particular destination device 110 that AP 120 has information ready for transmission to that device. Each Synch Signal will also contain an identification number, numbered from 0–N, which is used to distinguishes one Synch Signal from the next and may also be used to distinguish one time slot from the next. Data interval 320 is allocated for data packets which are communicated to and from the plurality of devices 110 and AP 120. It should be appreciated by those skilled in the art that devices 100 and AP 120 may utilize any of the well known channel access protocols, such as, but not limited to carrier sense multiple access (CSMA) to transmit data packets during the data interval 320.

Of note, each time slot 300 is of known duration. This permits devices 110 to readily calculate the boundaries for any time slot 300 based upon the common time reference established by Synch Signals 0–N, receipt of the Synch Signal ID and each respective time slot's duration. In accordance with the preferred embodiment N is 255. Thus, there are a total of 256 time slots in the repeatable sequence depicted in FIG. 3 and numbered 0–N.

Figure 4:
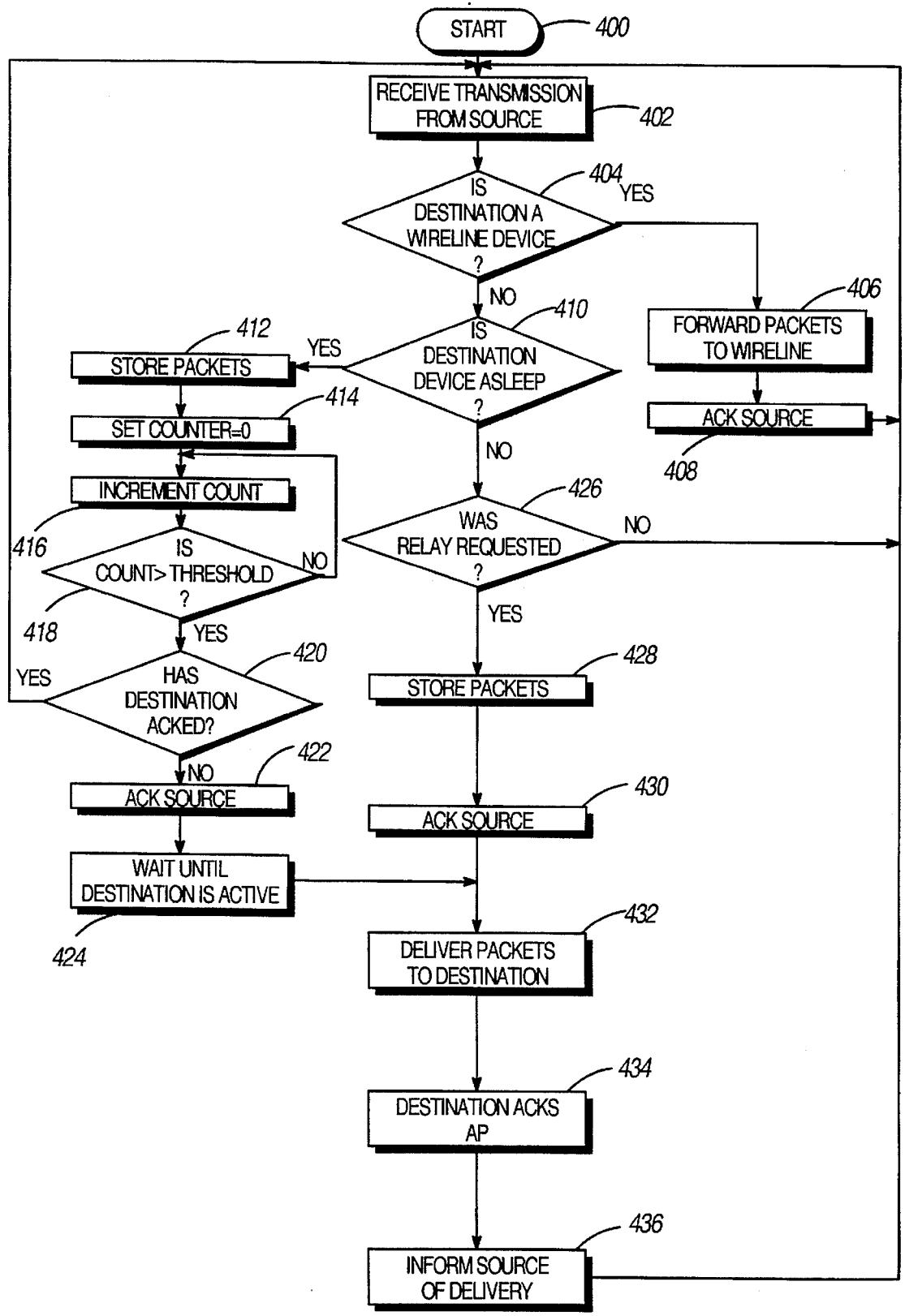
FIG. 4 is a flow chart diagram illustrating the steps performed by the access point of FIG. 1 in order to assure packet delivery in accordance with the present invention.

FIG. 4 is a flow chart diagram illustrating the steps performed by the access point of FIG. 1 in order to assure packet delivery in accordance with the present invention. Commencing at start block 400, flow proceeds to block 402 where AP 120 receives a transmission from a device 110 operating within the zone of radio coverage offered by AP 120. At block 404, AP 120 examines the transmission signal content to determine whether it is intended for a device connected to data network 130. Assuming it is, at block 406, AP 120 forwards the data packet portion of the signal to data network 130 via channel 132. At block 408, AP 120 transmits an acknowledgment signal back to the source device 110 informing it that the data has been delivered. From block 408, flow branches back to block 402 where AP 120 awaits the arrival of a new transmission.

From block 404, flow proceeds to block 410 if the destination device is not a wireline device connected to data network 130. At block 410 AP 120 determines, (i.e., estimates) whether the destination device 110 is in the sleep mode or not. This process is discussed in more detail in association with FIG. 6 herein below. Assuming destination device 110 is determined to be in the sleep mode, flow proceeds to block 412, where the data packets associated with the received transmission are stored in memory. At block 414 a counter is set to 0 and at block 416 the counter commences its counting operation. At block 418 a check is performed to determine whether the count has reached a predetermined threshold. If not, flow branches back to block 416 and the count continues. Assuming it has, flow proceeds to block 420 where a check is performed to determine whether destination device 110 actually acknowledged (ACKed the transmission received by AP 120 at block 402. This determination is made by AP 120 which monitors all transmissions that occur within its zone of radio coverage at the specified frequencies of operation intended for authorized devices 110. If the destination device 110 ACKed the transmission received by AP 120 at block 402, it is safe to assume that destination device 110 is not asleep and flow branches back to block 402.

Assuming no ACK was transmitted by destination device 110, flow proceeds to block 422 where AP 120 transmits an ACK to source device 110, informing it that the transmission has been received by AP 120 and is being scheduled for delivery to destination device 110. Of note, the ACK transmitted by AP 120 includes information (e.g., bit status) that will inform the source that the AP is performing data delivery and inhibiting the source device 110 from transmitting additional information to an asleep destination device. Instead, all additional information will be communicated to the AP for delivery to the destination device. This process will continue until AP 120 determines that the destination device has entered the active mode at block 424.

In order to perform this task, AP 120 maintains an event schedule for each device registered within the AP's zone of coverage. This schedule determines which of the Synch Signal transmission of FIG. 3, the device is required to monitor. Event scheduling may be as simple as maintaining a Synch Signal rate value such as, for example, the integer 3, or any integer value between 1 and N. In accordance with the present example, the device will enter the active mode in order to monitor every third Synch signal transmission 310.

In accordance with the preferred embodiment, N is 255 and the Synch signal rate is selected in accordance with the following equation.

Rate=$2^x$, where x is an integer $0 \leq x \leq 8$  1)

When the value of N is other than 255, equation 1 is expressed as:

Rate=$2^x$, where x is an integer $0 \leq x \leq Z$, where $Z=\log_2 (N+1)$ and N+1 is an integer power of 2.

As will be appreciated by those skilled in the art the above described relationship remains consistent even as the rate function changes. For example, if Rate=$3^x$ where x is an integer $0 \leq x \leq Z$, then $Z=\log_3 (N+1)$ where N+1 is an integer power of 3.

Since each time slot 300 of FIG. 3 is of known duration, it is relatively simple to estimate when the device must next awake in order to monitor a Synch Signal 310.

Referring back to block 410, assuming the destination device 110 is determined to be in the active mode, flow proceeds to block 426, where a check is performed to determine whether the transmission received at block 402 comprised a request from the source device 110 for the AP to deliver data to the destination device. Assuming no such request appears as part of the transmission, the AP will refrain from transmitting data to the destination device and flow will branch back to block 402. If, on the other hand, the transmission received at block 402 contains a request for AP 120 to deliver data to destination device 110, flow proceeds from block 426 to block 428, where the data packets associated with the received transmission are stored in memory. At block 430 AP 120 transmits an ACK to source device 110, informing it that the transmission has been received by AP 120 and is being scheduled for delivery to destination device 110. Of note, this ACK step is identical to the one described at block 422 above.

From block 424 or block 430, flow proceeds to block 432 where AP 120 delivers the stored data packets to the destination device in the active mode of operation. At block 434 and upon receipt of the delivered data packets, destination device 110 transmits an ACK to AP 130 informing AP 130 of the successful reception of the transmitted data. Of note, this ACK comprises a bit status that inhibits the source device from receiving the ACK. In this fashion, only AP 120 may receive the ACK transmitted at block 434. At block 436 AP 130 informs the source device of the successful delivery to destination device of the requested data. Of note, inclusive in the transmission to source device 110 is an indication (e.g., bit status) that source device 110 may now transmit data to destination device 110 which is now in the active mode of operation. From block 436, flow branches back to block 402 where the process continues.

Figure 5:
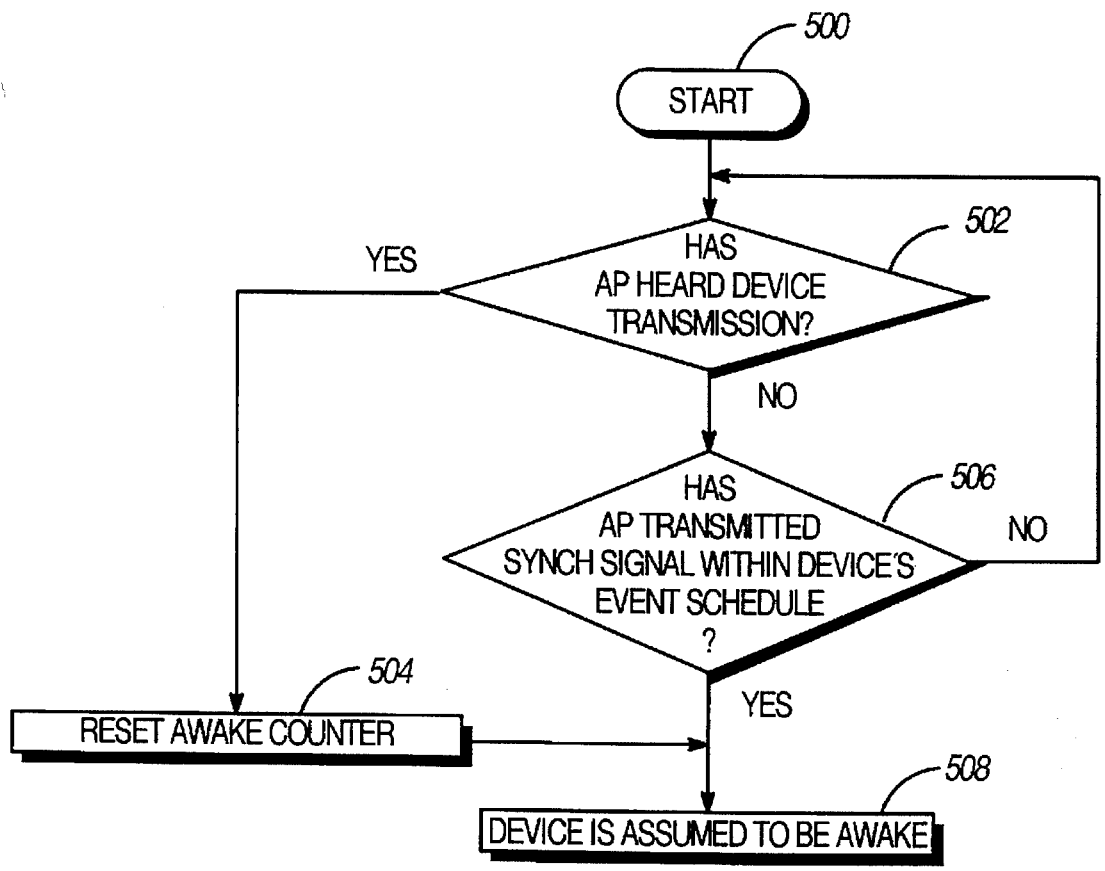
FIG. 5 is a flow chart diagram illustrating the steps performed by the access point in order to determine when a user device enters the active mode of operation.

FIG. 5 is a flow chart diagram illustrating the steps performed by MPU 220 of AP 120, while under the direction and control of a program instruction set stored in ROM 230 of FIG. 2, in order to estimate when a user device 110 enters the active mode of operation. Commencing at start block 500 it is assumed that the device in question is in the sleep mode of operation. As mentioned above, AP 120 stores in RAM 240 information comprising the event schedule for each user device 110 registered for operation within the zone of radio coverage provided by AP 120, In addition to an event schedule, AP 120 maintains an awake counter for each device. In this fashion, AP 120 attempts to track the status of each user device 110. From block 500 flow proceeds to block 502 where a check is performed to determine whether AP 120 has heard a transmission from the device in question. If so, AP 120 will reset the awake counter associated with that device to zero at block 504. This action equates to AP 120 determining at block 508 that the device is now in the active mode of operation.

Returning to block 502, if no transmission from the device in question is received by AP 120, flow proceeds to block 506 where a check is performed to determine whether AP 120 has transmitted a Synch Signal 310 which corresponds to an event to be monitored by the device in question. AP 120 makes such a determination by reviewing the event schedule for the device in question, as stored in AP memory 230. Assuming no Synch Signal which appears as an event to be monitored by the device in question has been transmitted, flow branches back to block 502 where the process continues. If, on the other hand, a Synch Signal which corresponds to an event to be monitored by the device in question has been transmitted, AP 120 may safely assume at block 508 that the device in question is now in the active mode of operation. Of note, whenever such a determination is made, AP 120 will begin incrementing the awake counter for the device in question until it receives an indication that the device has entered the sleep mode of operation.

Figure 6:
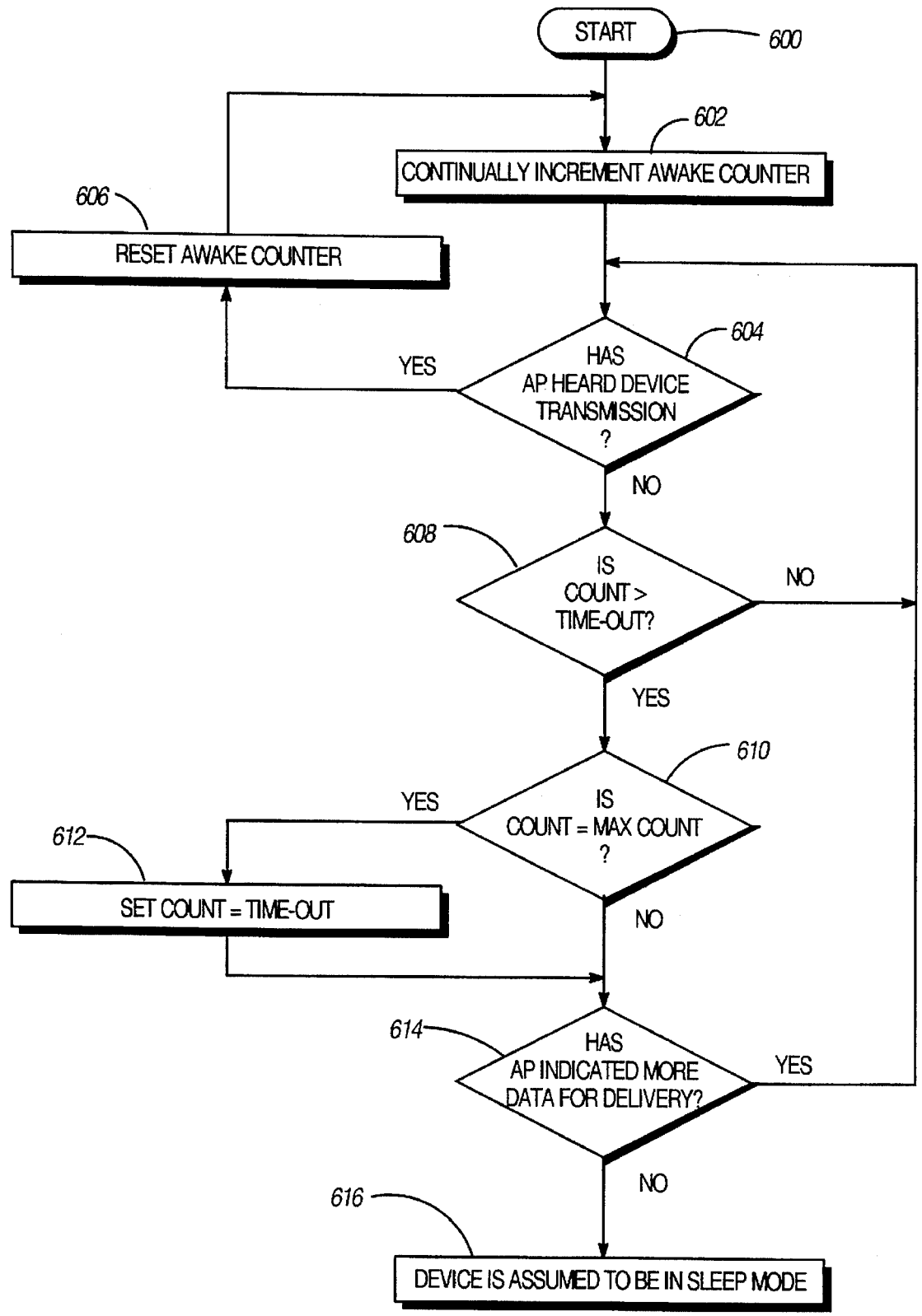
FIG. 6 is a flow chart diagram illustrating the steps performed by the access point in order to determine when a user device enters the sleep mode of operation.

FIG. 6 is a flow chart diagram illustrating the steps performed by MPU 220 of AP 120, while under the direction and control of a program instruction set stored in ROM 230 of FIG. 2, in order to estimate when a user device enters the sleep mode of operation. Commencing at start block 600 it is assumed that the device is in the active mode of operation. In accordance, the awake counter for that device, as maintained by AP 120 will be continually incrementing at block 602 as long as the device in question is presumed to be in the active mode. From block 602, flow proceeds to block 604 where a check is performed to determine whether AP 120 has received a transmission from the device in question. If so, flow proceeds to block 606 where the awake counter for that device is reset to zero and flow branches back to block 602 where the counter begins a new count. If, on the other hand, no transmissions have been received, flow proceeds from block 604 to block 608 where a check is made to determine whether the counter count is greater than a value of time-out. Assuming the count is less than the value of time-out, flow continually branches back to block 604 and the device is presumed to be in the active mode.

If, on the other hand, time-out has been reached, flow will then proceed from block 608 to block 610 where a check is performed to determine whether the counter has reached its maximum value. If so, flow branches to block 612, where the count is set to the value of time-out and flow proceeds to block 614. This operation is performed so that the counter is not inadvertently reset to zero, thereby falsing AP 120 to believe that the device is in the active mode, even though time-out has been satisfied.

From blocks 610 or 612, flow proceeds to block 614 where a check is performed to determine whether AP 120 transmitted information to the device in question indicating that additional information is to be transmitted. This indication may be communicated, for example, via the bit status of a Synch Signal 310, which indicates that AP 120 has additional data ready for transmission to the device in question. In addition, this indication may reside in the header of a data packet actually transmitted to the device.

If such an indication has been given, flow branches back to block 604, where it is assumed that the device will remain in the active mode in order to receive the additional information. If no such indication has been transmitted to the device in question, flow proceeds to block 616 where AP 120 pauses the awake counter under the assumption that the device has entered the sleep mode of operation.

It will be appreciated by those skilled in the art the system description provided herein is capable of providing additional advantageous functionality. For example, a source device which has commenced transmission of data packet, including fragments of that data packet, and without requesting relay from AP 120, may not thereafter request relay for the delivery of a remaining portion of the data associate with that original data packet. Conversely, once a source device has requested relay in association with the transmission of a data packet, it may not thereafter transmit a remaining portion of the data associate with that original data packet directly to the source device. In essence, once a transmission mode has been established for a particular data packet, that mode must be utilized for the transmission of all information associated with that data packet, fragmented or otherwise.

In those instances where more than one data packet requires delivery to an out-of-range destination device and relay has been requested for a first of said data packets, the system of the present invention anticipates that relay may be automatically requested for any additional source device packets requiring delivery to the out-of-range destination, assuming said delivery occurs within 1 second of a last successful relay delivery to that out-of-range destination.

What is claimed is:

1. A packet delivery method for assuring the delivery of packets in an wireless local area network (LAN) having a service access point (AP) and a plurality mobile user devices (UDs), said user devices in communication with each other and with the access point, said method comprising the steps of:

receiving, at the AP, a transmission comprising data from a source user device and destined for a destination user device;

determining whether the source device is requesting the AP to deliver data to the destination device; and, if so, inhibiting transmission from the source device of further data associated with the data while:

delivering the data to the destination user device;

receiving an acknowledgment from the destination user device;

informing the source user device of delivery of the data to the destination user device; and permitting the source device to thereafter transmit data to the destination device.

2. The method of claim 1 wherein the step of receiving data further comprises the step of receiving a plurality of data packets.

3. The method of claim 2 wherein the step of receiving data packets further comprises the step of receiving a plurality of fragmented data packets.

4. The method of claim 1 further comprising the step of the AP waiting for a time period to determine whether the destination user device acknowledges the source user device transmission.

5. The method of claim 1 further comprising the step of inhibiting the source user device from transmitting data to a destination user device in the sleep mode of operation.

6. The method of claim 1 further comprising the steps of:

determining whether the destination user device is a wireline device;

if true, then,
   forwarding the data to the wireline device; and transmitting an acknowledgment to the source user device.

7. The method of claim 1 further comprising the steps of:
determining whether the destination user device is in an active mode of operation;
if true, then,
   determining whether the source user device requested the AP to forward data to the destination user device;
if true, then,
   storing the data in memory;
   inhibiting the source user device from transmitting additional data to the out-of-range destination user device;
   delivering the stored data to the destination user device; and
   informing the source user device of delivery of the data to the destination user device;
else,
   refraining from transmitting the data to the destination user device.

8. The method of claim 7 wherein the step of informing the source user device further comprises the step of permitting the source user device to commence data transmission to the destination user device.

9. A packet delivery method for assuring the delivery of packets in an wireless local area network (LAN) having a service access point (AP) and a plurality mobile user devices (UDs), said user devices in communication with each other and with the access point, said method comprising the steps of:

receiving, at the AP, a transmission comprising data from a source user device and destined for a destination user device, the transmission selectively comprising a request indicating whether the source device is requesting the AP to deliver data to the destination device;

determining from the transmission whether the source device is requesting the AP to deliver data to the destination device; and, if so, inhibiting transmission from the source device of further data associated with the data while:

determining whether the destination user device is in a sleep mode of operation;

if true, then,
   storing the data in memory;
   waiting until the destination user device is active;
   delivering the data to the destination user device;
   receiving an acknowledgment from the destination user device; and
   informing the source user device of delivery of the data to the destination user device.

* * * * *